United States Patent [19]
Payne et al.

[11] Patent Number: 5,342,147
[45] Date of Patent: Aug. 30, 1994

[54] METHOD OF RECOVERING SUBSURFACE CONTAMINANTS

[75] Inventors: Frederick C. Payne, Charlotte; Galen L. Kilmer, Woodland, both of Mich.

[73] Assignee: ETG Environmental, Inc.-MWR Division, Lansing, Mich.

[21] Appl. No.: 125,782

[22] Filed: Sep. 24, 1993

[51] Int. Cl.⁵ .......................... B09B 1/00; B09B 3/00
[52] U.S. Cl. ....................... 405/128; 405/258
[58] Field of Search ............ 405/128, 129, 258, 131; 166/305.1, 246, 266; 134/21; 210/747, 751; 588/249, 234, 236

[56] References Cited

U.S. PATENT DOCUMENTS

| | | | |
|---|---|---|---|
| 5,067,852 | 11/1991 | Plunkett | 405/128 |
| 5,076,727 | 12/1991 | Johnson et al. | 405/128 |
| 5,169,263 | 12/1992 | Johnson et al. | 405/128 |
| 5,193,934 | 3/1993 | Johnson et al. | 405/128 |
| 5,228,804 | 7/1993 | Balch | 405/128 |
| 5,271,693 | 12/1993 | Johnson et al. | 405/128 |

Primary Examiner—Dennis L. Taylor
Attorney, Agent, or Firm—James D. Hall

[57] ABSTRACT

A method of recovering contaminants entrained in subsurface soils which includes establishing a plurality of vacuum withdrawal wells and a plurality of air injection wells adjacent to a contaminated zone of earth. The method includes operating the wells in this fashion for a predetermined time, then reversing the air flow through one or more of the wells to effect contaminant removal in previously untreated nodes in the well field.

7 Claims, 1 Drawing Sheet

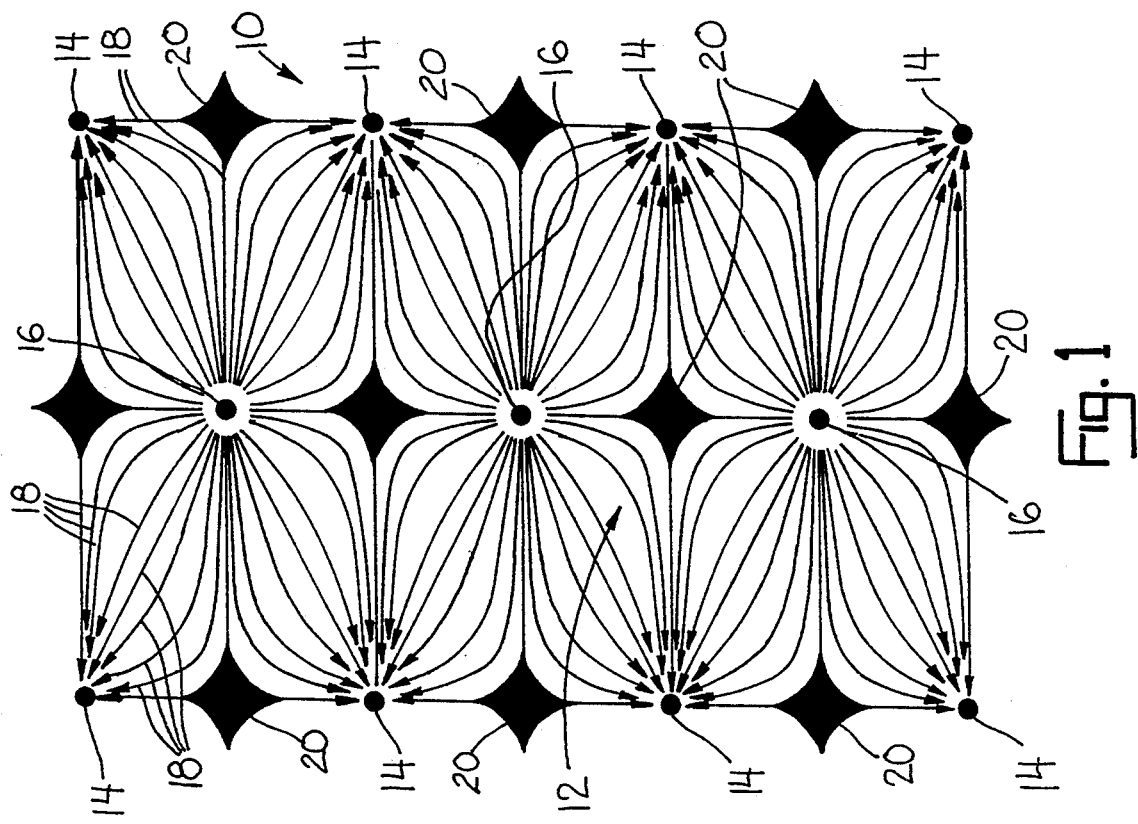
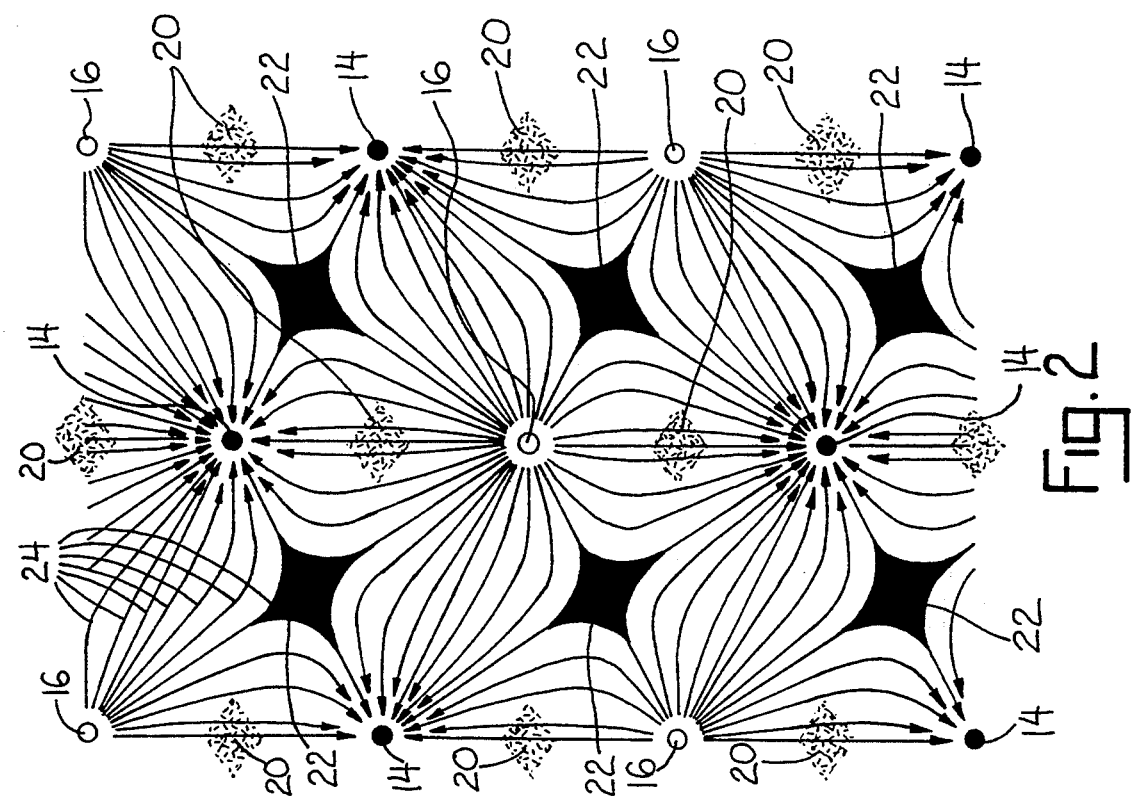

METHOD OF RECOVERING SUBSURFACE CONTAMINANTS

SUMMARY OF THE INVENTION

This invention relates to a method of recovering contaminants from subsurface soils, and will have application to a method of effectively treating all areas of a contaminated zone of earth.

In situ recovery of subsurface contaminants has been practiced commercially for several years. The principal method is outlined in U.S. Pat. Nos. 04,730,672; 4,890,673; 4,945,988; and 5,050,677, among others, and includes the establishment of vacuum withdrawal wells and air injection wells in and about the contaminated zone of earth. Air is flowed into the soil at the injection wells and withdrawn through the withdrawal wells. Generally the wells are spatially arranged in a grid pattern with the peripheral air injection wells spaced axially and laterally from the vacuum withdrawal wells to treat the maximum volume of contaminated soil.

In any grid pattern well field layout, there exist zones of untreated soil. The radial type air flow which is generated in the grid layout often leaves rough diamond-shaped nodes of untreated soil approximately midway between each well. The method of this invention prescribes the reversal of air flow direction at selected wells in the grid to allow for treatment of these previously untreated nodes. The invention includes a two-phase treatment in which the wells are all operated as above in phase one. In phase two, about half of the wells have the air flow direction reversed to flow air through the previously untreated nodes from phase one.

Accordingly, it is an object of this invention to provide for a novel and improved method of in situ subsurface contaminant recovery.

Another object is to provide for a contaminant recovery method which efficiently removes subsurface contaminants from all areas of a well field grid.

Another object is to provide for a contaminant recovery method which provides more comprehensive soil clean-up without the necessity of digging extra wells or purchasing extra equipment.

Other objects will become apparent upon a reading of the following description.

BRIEF DESCRIPTION OF THE DRAWINGS

A preferred well-field layout has been illustrated to depict the well field layout and the principles of the method of this invention, but is not to be viewed as limiting the invention to any particular arrangement or apparatus wherein:

FIG. 1 a plan view of the well field layout which illustrates phase-one treatment operations.

FIG. 2 is a plan view of the well field layout which illustrates phase-two operations.

DESCRIPTION OF THE EMBODIMENT

The preferred embodiment herein described is not intended to be exhaustive or to limit the invention to the precise form disclosed. It is chosen and described to illustrate the principles of the invention and its application and practical use to enable others skilled in the art to follow its teachings.

FIGS. 1 and 2 both illustrate a typical well field 10 which is used in the contaminant recovery method of this invention. Well field 10 is positioned in the area of a contaminated zone of earth 12 and for ease of illustration is depicted in the rectangular grid pattern shown. Generally, the contaminants are located in the subsurface soil above the water table or saturated zone. The basic process of recovery is disclosed in U.S. Pat. Nos. 4,730,672, incorporated herein by reference.

In the preferred method, a plurality of vacuum withdrawal wells 14 are established in contaminated zone 12 and terminate in or very near the contaminant plume. A plurality of air injection wells 16 are established in the contaminated zone 12 and are spaced both laterally and axially from withdrawal wells 14 as shown.

When well-field 10 is activated air is flowed through injection wells 16 and drawn up from zone 12 through withdrawal wells 14. The air flow is controlled by conventional pumps (not shown) and the system may be either open loop or closed loop as desired. For clarity of description, an open loop system will be described in this specification.

FIG. 1 illustrates the air flow through contaminated zone 12 during normal phase one operations. Due to the staggered configuration of well field 10, a radial air flow through zone 12 is achieved as shown by the arrows 18. The air flow is achieved by forming injection wells 16 of a single solid pipe with a rounded lower opening. This allows injected air to spread outwardly in all directions as it exits injection well 16. As the injected air travels through zone 12, it contacts contaminant (usually liquid phase VOC's) and serves to volatilize and/or carry the VOC's toward withdrawal wells 14 due to the lower pressure at each withdrawal well.

Initially upon injection, the injected air is forced away from the lower terminal end of the injection wells 16 in substantially straight lines through the soil pores. Since air naturally seeks out areas of lower pressure, the farther the injected air travels from the injection wells 16, the greater the influence of the pressure drop at withdrawal wells 14.

The resulting radial air flow illustrated by curved lines 18 in FIG. 1 results in the development of untreated pockets or nodes 20. Since relatively little (or no) air is flowed through nodes 20, contaminants entrained in the nodes are not recovered to acceptable extents.

Phase two of the method of this invention is illustrated in FIG. 2. In phase two, the direction of the air flow through selected wells 12 and 14 is reversed to change the air flow pattern through zone 12, such that air is flowed through previously untreated nodes 20. During phase two, untreated nodes 22 will be defined but these nodes 22 will have been previously cleansed of contaminants in phase one.

The well field 10 illustrated in FIGS. 1 and 2 is depicted for example only as a common four-three-four rectangular grid field. Any of a number of acceptable configurations of field 10 may be employed within the limits of this invention. In the 4×3×4 pattern shown, the outer withdrawal wells 14 and inner injection wells 16 leave untreated nodes 20 at the locations shown.

Phase two cleanup includes reversing air flow in every other well 12 or 14 to produce the subsurface air flow as illustrated by arrows 24. During phase two air is flowed through each previously untreated node 20 to effectively volatilize the contaminants therein and complete the recovery process.

It is understood that the invention is not limited to the details above, but may be modified within the scope of the following claims.

I claim:

1. A method of recovering contaminants entrained in subsurface soils comprising the steps of:
   a) establishing a plurality of vacuum withdrawal wells terminating in such subsurface soils adjacent said contaminants;
   b) establishing a plurality of air injection wells peripherally spaced from said vacuum withdrawal wells;
   c) injecting air into said subsurface soils through said air injection wells;
   d) drawing air and contaminants out of said subsurface soils through said vacuum withdrawal wells to create a zone of reduced air pressure adjacent the withdrawal wells; and
   e) after a predetermined time injecting air into said subsurface soils through at least one of said vacuum withdrawal wells, and drawing air out of said subsurface soils through at least one of said air injection wells wherein subsurface soil air flow is redirected to distribute air into previously untreated subsurface zones.

2. The method of claim 1 wherein step a) includes establishing at least three vacuum withdrawal wells in a substantially straight-line orientation.

3. The method of claim 1 wherein step b) includes establishing at least three air injection wells in a substantially straight-line orientation.

4. The method of claim 2 wherein step b) includes establishing at least three air injection wells in a substantially straight-line orientation and substantially parallel with respect to said vacuum withdrawal wells.

5. The method of claim 4 wherein step b) further includes establishing three additional vacuum withdrawal wells in a substantially straight-line orientation and substantially parallel with respect to said air injection wells, said air injection wells positioned between said first-mentioned three vacuum withdrawal wells and said three additional vacuum withdrawal wells.

6. The method of claim 5 wherein said vacuum withdrawal wells are axially spaced from said air injection wells along two axes to establish a radial air flow through said subsurface soils.

7. A method of recovering contaminants entrained in subsurface soils comprising the steps of:
   a) establishing a plurality of vacuum withdrawal wells terminating in said subsurface soils adjacent to said contaminants;
   b) establishing a plurality of air injection wells axially spaced in two directions from said vacuum withdrawal wells to establish a radially curved air flow through said subsurface soils;
   c) injecting air through said air injection wells into said subsurface soils;
   d) drawing air and contaminants out of said subsurface soils through said vacuum withdrawal wells to create a zone of reduced air pressure adjacent each vacuum withdrawal well; and
   e) after a predetermined time reversing direction of the air flow through every other said air injection well and every other vacuum withdrawal well to divert air flow through said subsurface soils to previously untreated zones.

* * * * *